(12) United States Patent
Matosevich et al.

(10) Patent No.: US 11,262,933 B2
(45) Date of Patent: Mar. 1, 2022

(54) SHARING MEMORY RESOURCES BETWEEN ASYNCHRONOUS REPLICATION WORKLOADS

(71) Applicant: EMC IP Holding Company LLC, Hopkinton, MA (US)

(72) Inventors: Rivka Matosevich, Zichron Ya'acov (IL); Evgeny Katz, Haifa (IL); Doron Tal, Haifa (IL); Roman Spiegelman, Yokneam Illit (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/918,654

(22) Filed: Jul. 1, 2020

(65) Prior Publication Data
US 2022/0004320 A1   Jan. 6, 2022

(51) Int. Cl.
*G06F 3/06* (2006.01)

(52) U.S. Cl.
CPC .............. *G06F 3/065* (2013.01); *G06F 3/061* (2013.01); *G06F 3/067* (2013.01); *G06F 3/0655* (2013.01); *G06F 3/0676* (2013.01); *G06F 3/0679* (2013.01)

(58) Field of Classification Search
CPC ........ G06F 3/065; G06F 3/061; G06F 3/0655; G06F 3/067; G06F 3/0676; G06F 3/0679
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |

(Continued)

FOREIGN PATENT DOCUMENTS

WO PCT/US2019/024885   1/2020
WO PCT/US2019/024900   1/2020

OTHER PUBLICATIONS

Dell EMC, "Dell EMC VxRack FLEX," Dell EMC Product Overview, 2018, 5 pages.

(Continued)

*Primary Examiner* — Nanci N Wong
(74) *Attorney, Agent, or Firm* — Ryan, Mason & Lewis, LLP

(57) ABSTRACT

Techniques are provided for managing the utilization of shared memory resources among a plurality of asynchronous replication workloads. A data replication system maintains a respective replication journal for each replication workload in an allocated portion of system memory of a source server node. Each replication journal is divided into journal barrier intervals by respective individual barriers for transmission to a destination server node. The data replication system waits for a triggering event to occur for generating a common barrier, wherein the triggering event is configured to prevent exhaustion of the allocated portion of system memory for storing the replication journals. The common barrier is generated to close the replication journals of some or all of (Continued)

the replication workloads in advance of the respective individual barriers associated, and the replication journals closed by the common barrier are transmitted to the destination server node.

20 Claims, 7 Drawing Sheets

(56) References Cited

U.S. PATENT DOCUMENTS

| | | | |
|---|---|---|---|
| 6,941,420 | B2 | 9/2005 | Butterworth et al. |
| 8,832,395 | B1* | 9/2014 | Watanabe ............ G06F 11/1076 |
| | | | 711/161 |
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,877,900 | B1* | 12/2020 | Muthiah ............. G06F 9/44505 |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2014/0059270 | A1* | 2/2014 | Zaltsman ................ G06F 13/28 |
| | | | 711/103 |
| 2016/0019254 | A1* | 1/2016 | Vijayrao ............... G06F 16/235 |
| | | | 707/737 |
| 2016/0103764 | A1 | 4/2016 | Banerjee et al. |
| 2017/0031769 | A1* | 2/2017 | Zheng ................. G06F 11/1471 |
| 2017/0109096 | A1* | 4/2017 | Jean .......................... G06F 9/00 |
| 2017/0161100 | A1* | 6/2017 | Rashid .................... G06F 13/12 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 12 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006. 1598129, pp. 200-211.
Wikipedia, "Raft (Computer Science)," https://en.wikipedia.org/wiki/Raft_(computer_science), Feb. 10, 2020, 4 pages.
Wikipedia, "Paxos (ComputerScience)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."
U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."
U.S. Appl. No. 16/807,709 filed in the name of Avi Puder et al. filed Mar. 3, 2020, and entitled "Management of Shared Resources in a Software-Defined Storage Environment."
U.S. Appl. No. 16/822,818 filed in the name of Itay Keller et al. filed Mar. 18, 2020, and entitled "Storage System Implementing Snapshot Longevity Ranking for Efficient Management of Snapshots."
U.S. Appl. No. 16/822,848 filed in the name of Itay Keller et al. filed Mar. 18, 2020, and entitled "Assignment of Longevity Ranking Values of Storage Volume Snapshots Based on Snapshot Policies."
U.S. Appl. No. 16/823,813 filed in the name of Itay Keller et al. filed Mar. 19, 2020, and entitled "Managing Incompressible Data in a Compression-Enabled Log-Structured Array Storage System."
U.S. Appl. No. 16/830,469 filed in the name of Roi Tagar et al. filed Mar. 26, 2020, and entitled "Storage Block Balancing Using Volme Part Migration."
U.S. Appl. No. 16/830,473 filed in the name of Yugal Peleg Lieblich et al. filed Mar. 26, 2020, and entitled "Replicated State Cluster with Standby Node State Assessment During Leadership Transition."
U.S. Appl. No. 16/830,946 filed in the name of Gil BenZeev et al. filed Mar. 26, 2020, and entitled "Storage Volume Migration Scheduling Based on Storage Volume Priorities and Specified Constraints."
U.S. Appl. No. 16/832,763 filed in the name of Michal Yarimi et al. filed Mar. 27, 2020, and entitled "Managing Storage Device Errors During Processing of Inflight Input/Output Requests."
U.S. Appl. No. 16/834,363 filed in the name of Itay Keller et al. filed Mar. 30, 2020, and entitled "Managing Least Recently Used Cache Using Reduced Memory Footprint Sequence Container."
U.S. Appl. No. 16/836,824 filed in the name of Itay Keller et al. filed Mar. 31, 2020, and entitled "Management of Volume Snapshots in a Data Storage System."
U.S. Appl. No. 16/888,742 filed in the name of Rivka Matosevich et al. filed May 31, 2020, and entitled "Balancing Resiliency and Performance by Selective Use of Degraded Writes and Spare Capacity in Storage Systems."

* cited by examiner

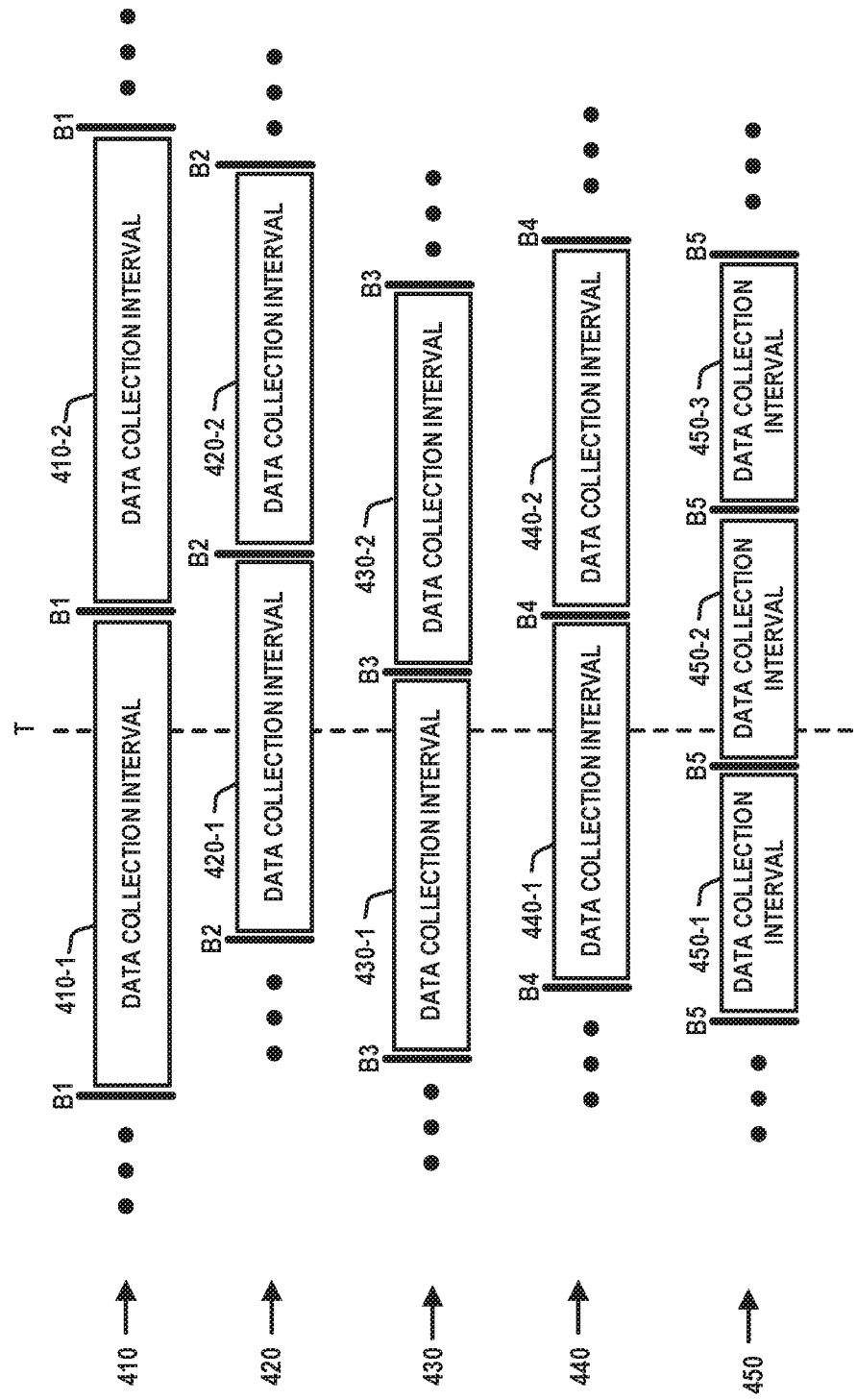

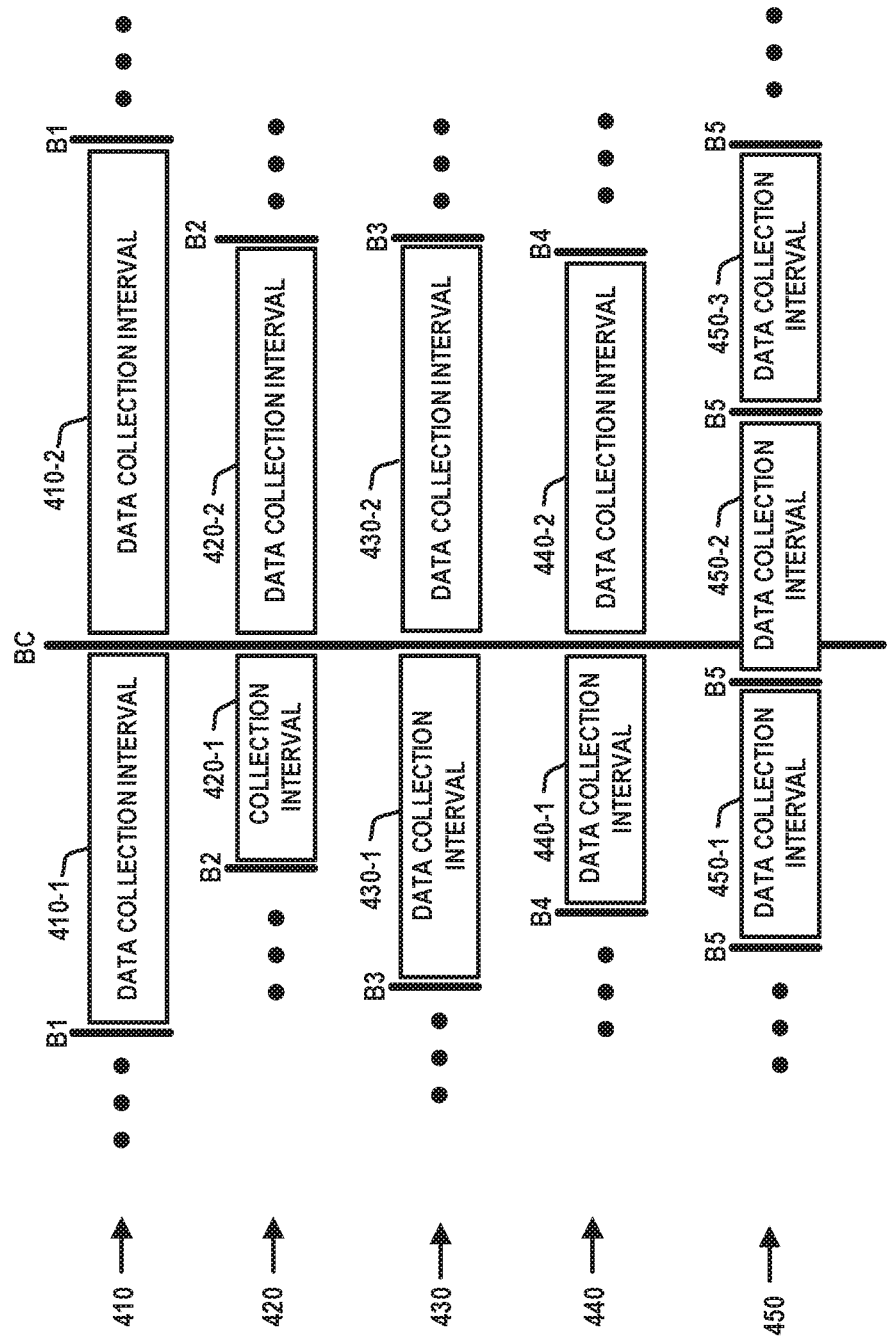

SHARING MEMORY RESOURCES BETWEEN ASYNCHRONOUS REPLICATION WORKLOADS

TECHNICAL FIELD

This disclosure relates generally to data storage management in information processing systems and, more particularly, to data replication techniques for data storage systems.

BACKGROUND

Information processing systems typically implement data protection and disaster recovery techniques to protect against loss of critical system and application data. For example, data replication is one type of data protection technique that can be utilized to support disaster recovery. In general, data replication involves storing primary data (e.g., production data) at a primary site and storing a copy of the primary data at one or more remote sites to maintain one or more replicas of the primary data. There are two types of data replication techniques which depend on whether replication of the primary data is performed synchronously or asynchronously.

In particular, synchronous replication generally involves writing data to both a source (primary) volume and a destination (replica) volume before acknowledging completion of the I/O write operation to a host application. In this regard, synchronous replication is utilized for applications which require the primary data and the replica data to remain synchronized in real-time to provide high availability of critical systems or applications. In the event of a failure at the primary site, applications can failover to a remote site and resume operation with assurance of zero data loss. On the other hand, asynchronous replication generally involves writing data to the source volume, and acknowledging completion of the I/O write operation to the host application before the data is replicated to the destination volume. With asynchronous replication, the I/O write operations at the source site are logged in a replication journal, and the replication journal is periodically transmitted at scheduled times to a destination site which processes the replication journal to replicate the data to the destination volume.

A data replication system is typically configured to manage multiple replication workloads that execute concurrently in a heterogenous environment comprising multiple replication consistency groups which can have different data replication policies and objectives. The data replication system utilizes shared system resources (e.g., memory, storage, etc.) of the information processing system to manage the replication workloads. The sharing of the system resources among the executing replication workloads can result in starvation of the system resources to some smaller replication workloads, which can result in violations in the specified policies and/or objectives of such replication workloads.

SUMMARY

Exemplary embodiments of the disclosure include techniques for managing the utilization of shared memory resources among a plurality of asynchronous replication workloads. For example, an exemplary embodiment includes a method that is implemented by a data replication system. The data replication system receives I/O write requests associated with a plurality of replication workloads executing concurrently on a source server node which hosts the data replication system. The data replication system maintains a respective replication journal for each replication workload in an allocated portion of system memory of the source server node, wherein each replication journal is divided into journal barrier intervals by respective individual barriers for transmission to a destination server node based, at least in part, on respective recovery point objectives associated with the replication workloads. The data replication system determines an occurrence of a triggering event for generating a common barrier, wherein the triggering event is configured to prevent exhaustion of the allocated portion of system memory for storing the replication journals of the plurality of replication workloads in the allocated portion of system memory of the source server node. The data replication system generates the common barrier to close the respective replication journals of at least two replication workloads in advance of the respective individual barriers associated with the at least two replication workloads. The data replication system transmits the replication journals closed by the common barrier, to the destination server node.

Other embodiments of the disclosure include, without limitation, systems and articles of manufacture comprising processor-readable storage media, which are configured to manage utilization of shared memory resources among a plurality of asynchronous replication workloads.

BRIEF DESCRIPTION OF THE DRAWINGS

FIG. 4A illustrates data collections intervals associated with a plurality of parallel replication workloads.

FIG. 4B illustrates data collection intervals that are generated for the plurality of parallel replication workloads of FIG. 4A when applying a common barrier to close replication journals associated with two more of the replication workloads, according to an exemplary embodiment of the disclosure.

DETAILED DESCRIPTION

Exemplary embodiments of the disclosure will now be discussed in further detail with regard to systems and methods for implementing a data replication system which is configured for managing the utilization of shared system resources (e.g., memory, storage, etc.) among a plurality of asynchronous replication workloads. For purposes of illustration, exemplary embodiments will be described herein with reference to exemplary information processing systems which implement data storage systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1A:
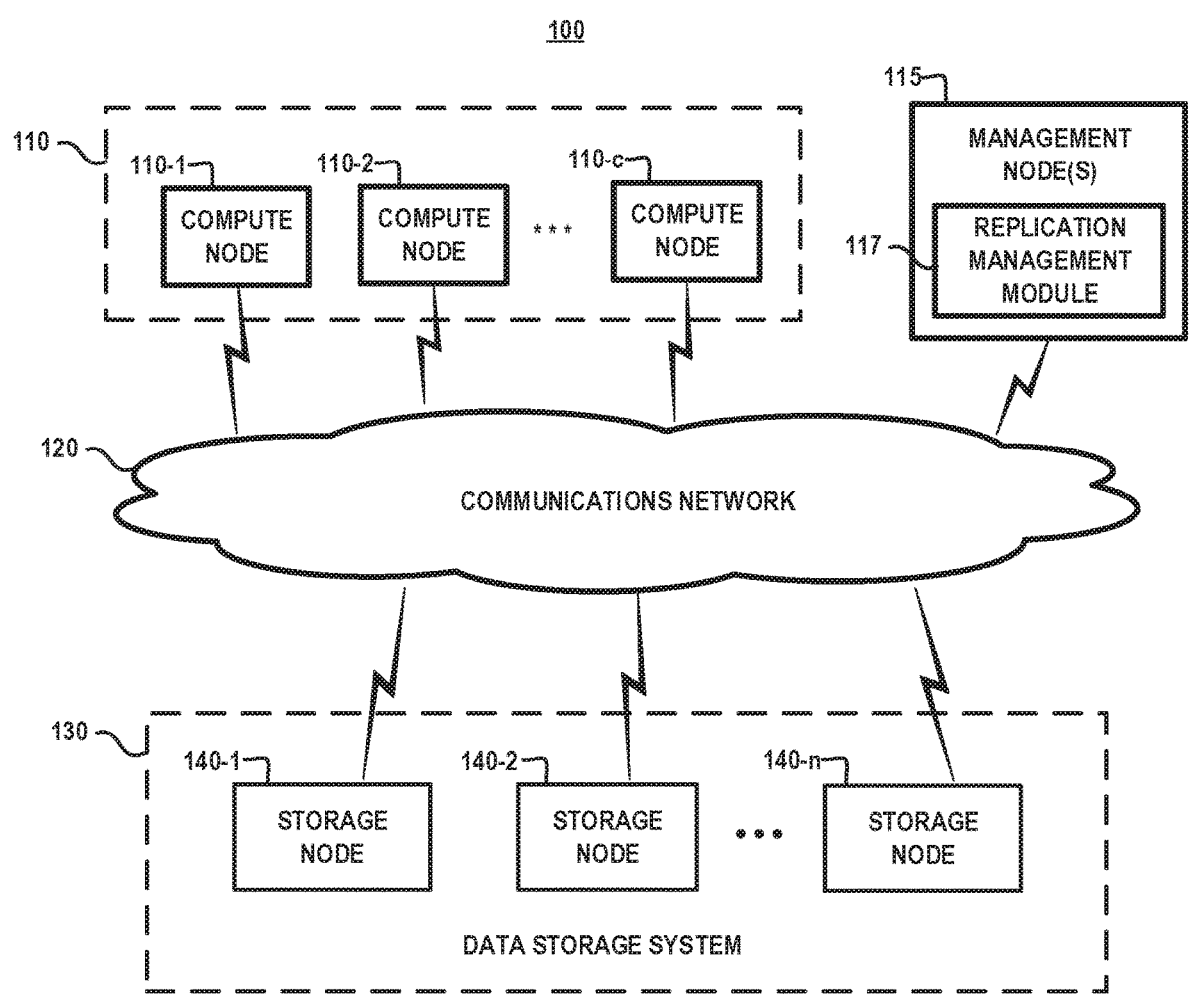
FIGS. 1A and 1B schematically illustrate an information processing system comprising a data replication system which is configured for managing the utilization of shared memory resources among a plurality of asynchronous replication workloads, according to an exemplary embodiment of the disclosure.
Figure 1B:
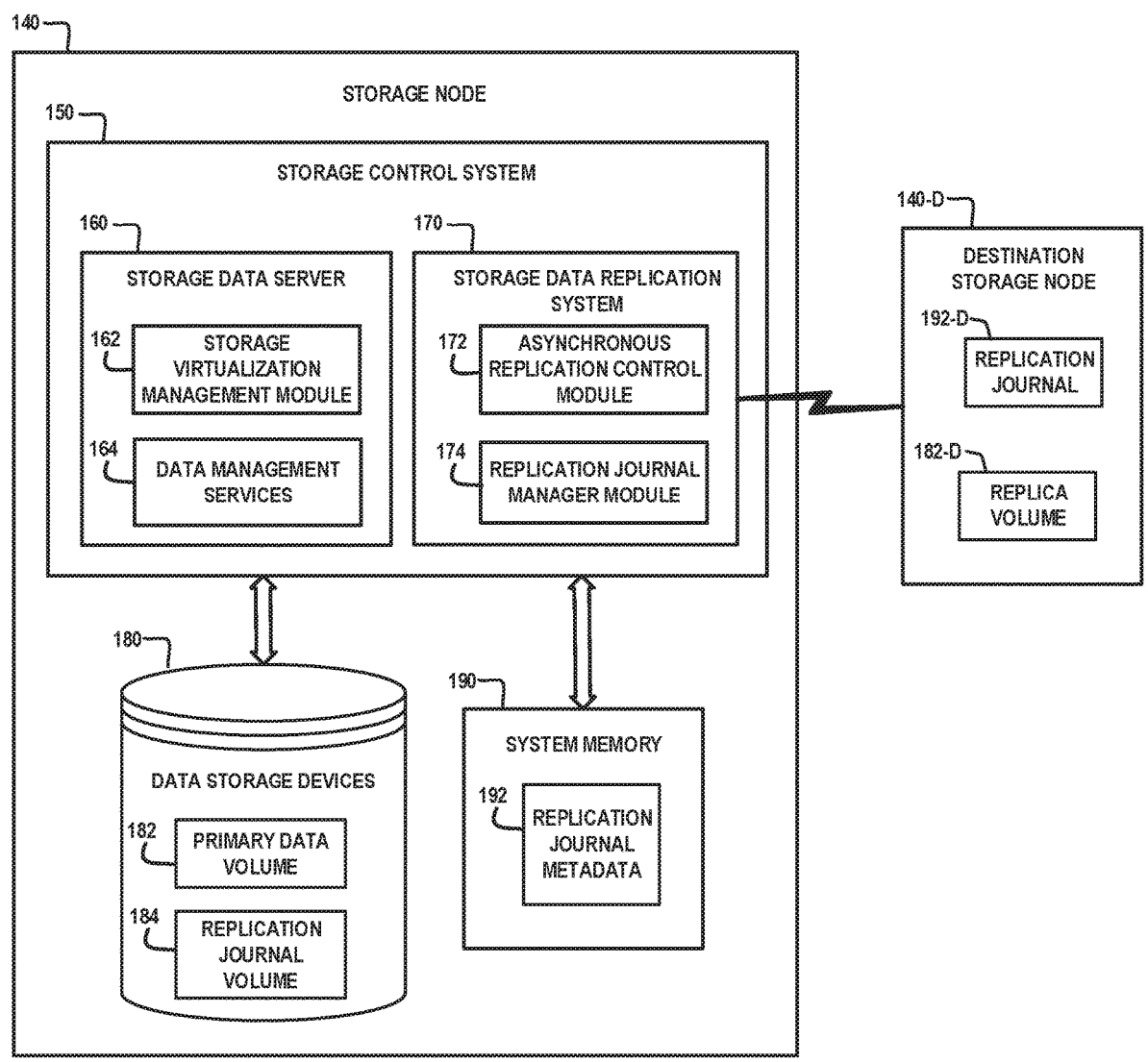

FIGS. 1A and 1B schematically illustrate an information processing system comprising a data replication system which is configured for managing the utilization of shared system resources among a plurality of asynchronous replication workloads, according to an exemplary embodiment of the disclosure. More specifically, FIG. 1A schematically illustrates an information processing system 100 which comprises a plurality of compute nodes 110-1, 110-2, ..., 110-c (collectively referred to as compute nodes 110), one or more management nodes 115 (which implement a management layer of the system 100), a communications network 120, and a data storage system 130 (which implement a data storage layer of the system 100). The data storage system 130 comprises a plurality of storage nodes 140-1, 140-2, ..., 140-n (collectively referred to as storage nodes 140, or each singularly referred to as storage node 140). In the context of exemplary embodiments as discussed in further detail below, the management nodes 115 implement a data replication management module 117 which implements methods to perform various management functions to control, e.g., asynchronous data replication operations that are performed by the storage nodes 140. FIG. 1B schematically illustrates an exemplary framework of some or all the storage nodes 140.

In particular, as shown in FIG. 1B, the storage node 140 comprises a storage control system 150 comprising a storage data server 160, a storage data replication system 170, local data storage devices 180, and system memory 190. The storage data server 160 comprises various modules including, but not limited to, a storage virtualization management module 162 and one or more modules to support data management services 164. The storage data replication system 170 comprises various modules including, but not limited to, an asynchronous replication control module 172, and a replication journal manager module 174, the functions of which will be explained in further detail below. In some embodiments, the storage control system 150 comprises a software-defined storage system wherein, the storage data server 160 and the storage data replication system 170 are integrated software modules of the storage control system 150. In other embodiments, the storage data replication system 170 comprises a stand-alone software system that separate from the storage control system 150 but configured to operate in conjunction with the storage control system 150. It is to be further noted that the storage control system 150 may include additional modules and other components that are typically included in various implementations of storage control systems (e.g., software-defined storage systems), although such additional modules and other components are omitted for clarity and simplicity of illustration.

The compute nodes 110 illustratively comprise physical compute nodes and/or virtual compute nodes which host applications, process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. The compute nodes 110 are configured to write data to and read data from the storage nodes 140 in accordance with applications executing on the compute nodes for system users. The compute nodes 110 illustratively issue I/O requests that are processed by a corresponding one of the storage nodes 140. The term I/O request as used herein refers to at least one of input and output. For example, an I/O request may comprise a write request and/or a read request directed to stored data of a given one of the storage nodes 140 of the data storage system 130.

The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly construed and not viewed as being limited to storage systems of any particular type or types. A storage system in some embodiments can be implemented using a combination of storage nodes and compute nodes. In some embodiments, the storage nodes 140 comprise storage server nodes (e.g., server node 600, shown in FIG. 6) having one or more processing devices each having a processor and a memory, possibly implementing virtual machines and/or containers, although numerous other configurations are possible. In some embodiments, one or more of the storage nodes 140 can additionally implement functionality of a compute node 110, and vice-versa. The term "storage node" as used herein is therefore intended to be broadly construed as a server node (e.g., a physical server machine) which comprises local persistent storage devices (e.g., storage devices 180) and which comprises a storage control system (e.g., storage control system 150, FIG. 1B) that is configured to manage and control access to the local persistence storage devices. A storage node may further comprise one or more compute nodes to process data and execute tasks/workloads.

In some embodiments, as schematically illustrated in FIG. 1B, the storage node 140 is a physical server node or storage appliance, wherein the data storage devices 180 comprise DAS resources (internal and/or external storage resources) such as hard-disk drives (HDDs), solid-state drives (SSDs), Flash memory cards, or other types of non-volatile memory (NVM) devices such non-volatile random access memory (NVRAM), phase-change RAM (PC-RAM) and magnetic RAM (MRAM). These and various combinations of multiple different types of storage devices 180 may be implemented in the storage node 140. In this regard, the term "storage device" as used herein is intended to be broadly construed, so as to encompass, for example, SSDs, HDDs, flash drives, hybrid drives or other types of storage media. The data storage devices 180 are coupled to the storage node 140 through any suitable host interface, e.g., a host bus adapter, using suitable protocols such as ATA, SATA, eSATA, NVMe, SCSI, SAS, etc. In other embodiments, the storage node 140 can be network connected to one or more NAS nodes over a local area network.

The storage control system 150 is configured to manage the storage devices 180 and control I/O access to the storage devices 180 and/or other storage resources (e.g., DAS or NAS resources) that are directly attached or network-connected to the storage node 140. As noted above, in some embodiments, the storage control system 150 is implemented as part of a software-defined storage system which supports the virtualization of the storage devices 180 by separating the control and management software from the underlying hardware architecture of the storage devices 180. The storage control system 150 runs on a server operating system of the storage node 140 to provide storage services. More specifically, in a software-defined storage environment, the storage data server 160 is configured to abstract storage access services from the underlying storage hardware, and thereby control and manage I/O requests issued by the compute nodes 110, as well as support networking and connectivity. In this instance, the storage control system 150 comprises a software layer that is hosted by the storage node 140 and deployed in the data path between the compute nodes 110 and the storage devices 180 of the storage node 140, wherein the storage control system 150 is configured to process I/O requests from the compute nodes 110 by accessing the storage devices 180 to store/retrieve data to/from the storage devices 180 based on the I/O requests.

In a software-defined storage environment, the storage control system 150 comprises the storage data server 160 that is installed on each storage node that will contribute its storage to the data storage system. The storage control system 150 is configured to provision, orchestrate and manage the local storage resources (e.g., the storage devices 180) of the storage node 140. For example, the storage data server 160 implements methods that are configured to create and manage storage pools (e.g., virtual pools of block storage) by aggregating capacity from the storage devices 180. The storage data server 160 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.).

In the software-defined storage environment, each of the storage nodes 140 in FIG. 1A can run an instance of the storage control system 150 to convert the respective local storage resources (e.g., DAS storage devices and/or NAS storage devices) of the storage nodes 140 into local block storage. Each instance of the storage data sever 160 contributes some or all of its local block storage (HDDs, SSDs, PCIe, NVMe and flash cards) to an aggregated pool of storage of a storage server node cluster (e.g., cluster of storage nodes 140) to implement a server-based SAN (e.g., virtual SAN). In this configuration, each storage node 140 is part of a loosely coupled server cluster which enables "scale-out" of the software-defined storage environment, wherein each instance of the storage data server 160 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage data servers 160 operating to create and expose volumes of a storage layer, the software-defined storage environment comprises other components such as (i) data storage clients that consume the storage layer and (ii) metadata managers that coordinate the storage layer. More specifically, on the client-side (e.g., compute nodes 110), an SDS data storage client (SDC) is a lightweight block device driver that is deployed on each node (e.g., server node) that consumes the shared block storage volumes that are exposed by the storage data servers 160 of the storage nodes 140. A given SDC presents the volumes as block devices to the application(s) located on the server node on which the given SDC is installed. The SDC exposes block devices representing the virtual storage volumes that are currently mapped to that host. In particular, the SDC serves as a block driver for a client (server), wherein the SDC intercepts I/O requests issued by a compute node 110, and utilizes the intercepted I/O request to access the block storage that is managed by the storage control systems 150. The SDC provides the operating system or hypervisor (which runs the SDC) access to the logical block devices (e.g., volumes).

In the software-defined storage environment, the primary data and copies of each storage volume are distributed over the storage nodes 140, and each SDC has knowledge of which storage data server 160 holds its block data, so multipathing can be accomplished natively through the SDCs. In particular, each SDC knows how to direct an I/O request to the relevant destination SDS storage data server (e.g., storage control system 150). In this regard, there is no central point of routing, and each SDC performs is own routing independent from any other SDC. This implementation prevents unnecessary network traffic and redundant SDS resource usage. Each SDC maintains peer-to-peer connections to every storage control system 150 that manages the storage pool so each SDC can communicate over multiple pathways to all of the storage nodes 140 which store the data. The multi-point peer-to-peer communication fashion allows the SDCs to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the storage data servers 160. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers (e.g., storage control systems 150) run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, the various modules of the storage control system 150 of FIG. 1B collectively provide data storage and management methods that are configured to perform various function as follows. In particular, the storage data server 160 comprises the storage virtualization management module 162 which implements any suitable logical volume management (LVM) system that is configured to create and manage local storage volumes by aggregating the local storage devices 180 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage devices 180 are configured as block storage devices where raw volumes of storage are created and each block can be controlled as, e.g., an individual disk drive by the storage control system 150. Each block can be individually formatted with a same or different file system as required for the given data storage system application. The storage pools are primarily utilized to group storage devices based on device types and performance. For example, SSDs are grouped into SSD pools, and HDDs are grouped into HDD pools. Furthermore, in some embodiments, the data management services 164 implement methods to support various data storage management services such as data protection, data migration, data deduplication, thin provisioning, snapshots, data backups, etc.

The storage data replication system 170 implements various methods that are configured to support data replication operations. For example, the asynchronous replication control module 172 implements methods that are configured to support asynchronous data replication operations to replicate data of a primary (source) data volume 182, which is stored in the local data storage devices 182 of the source storage node 140, to a replica volume 182-D that is stored on local data storage devices of a destination storage node 140-D. It is to be understood that some or all of the storage nodes 140 of the data storage system 130 implement an instance of the storage data replication system 170, wherein a given storage data replication system 170 on a given storage node 140 can serve as (i) a source replication system (e.g., to replicate data of the local primary data volume 182 to a remote replication volume 182-D, as shown in FIG. 1B), and/or (ii) a destination replication system to storage data in a local replica volume using a replication journal and associated data received from a source replication system.

It is to be noted that the term "replication consistency group" as used herein refers to a logical container for volumes whose application data need to be replicated with consistency. A replication consistency group contains volume pairs, which are pairs of volumes with primary volume at a source node and a replica volume at a destination node, wherein the data of the primary volume is replicated to the replica volume. For example, in the exemplary embodiment of FIG. 1B, the primary data volume 182 and the replica volume 182-D comprise a volume pair.

The replication journal management module 174 implements methods that are configured to generate and manage replication journals for asynchronous replication workloads that are processed by the storage data replication system 170. As is known in the art, a journal-based asynchronous replication system will buffer to new writes to either cached or dedicated volumes known as either journal volumes or write intent logs before asynchronously transmitting the replication journals to destination nodes. The replication journal for a given replication workload is divided into data collection intervals (alternatively referred to as journal barrier-intervals) by generating journal barriers at given points in time to enable consistency between the primary volume and replication volume at each point in time a journal barrier is generated.

More specifically, as I/O write data is collected for a given replication workload over time, a journal barrier is created at a given point in time, and all I/O write data that is collected up to the time of the journal barrier (and following a previously generated journal barrier) is transmitted to a replica (destination) site for synchronizing the journal data to the replica volume. In this regard, journal-based asynchronous replication enables the application of write sequence metadata so that when the contents of the journal volume are copied to the destination node, writes are committed to the replica volume in the same order that they were committed to the source volume.

In the source storage node 140, for replicated volumes, the compute nodes 110 (e.g., the SDCs that execute on the compute nodes 110) communicate with the storage data replication system 170. For non-replicated volumes, the compute nodes 110 communicate directly with the storage data server 160 as the storage devices 180 are managed by the storage data server 180. The storage data replication system 170 serves as a pipeline for I/Os as application I/Os (both reads and writes) intended for replication volumes are sent from a compute node 119 to the storage data replication system 170. The source storage data replication system 170 processes all I/O requests associated with replication volumes and package the I/O write data into a consistent journal barrier and distills the write data (e.g., write-folding) so that only the most recent writes are included. The source storage data replication system 170 transmits the journal barrier for a given asynchronous replication workload to a target storage data replication system in the destination storage node 140-D. At the destination storage node 140-D, the target storage data replication system stored the replication journal 192-D and processes the replication journal barrier to update the replica volume 182-D.

At the source storage node 140, the replication journal manager module 174 implements methods that are configured to store the I/O write data at the source node before it is sent to the destination node. At the destination, the journal stores the data before it is applied to the destination volumes. Once the I/Os are sent to the destination journal, they are cleared from the source journal. Once the I/Os are applied to the target volumes, they are cleared from the destination journal.

The manner in which I/O data is stored in a replication journal will vary depending on the implementation. For example, in some embodiments, a copy of the I/O write data is stored in a replication journal volume 184 in storage (e.g., HDD, or SSD storage) while replication journal metadata 192 is stored in the system memory 190. In this instance, the replication journal volume 184 comprises an actual copy of the data that was written to the primary data volume 182, while the replication journal metadata 192 would comprise information regarding the I/O write transaction, including, but not limited to, one or more identifiers, a time stamp (denoting date and time at which the I/O write transaction was received by source), a write size of the data block, a location (pointer) in the replication journal volume 184 where the actual I/O write data is stored, a location in the replica volume 182-D where the data is to be written, etc. In some embodiments, the actual I/O write data is stored in the system memory 190 in association with the journal metadata, in which case the replication journal metadata 192 would not include a pointer to the I/O write data in the replication journal volume 184.

The amount of system memory 190 that is allocated for storing replication journal meta data 192 is limited. When the portion of system memory 190 allocated to replication journal metadata is shared amount a plurality of replication workloads, the shared use of the system 190 can present a bottleneck for synchronizing journal data to the replica sites. As explained in further detail below, the times at which journal barriers are generated for dividing the replication journal of a given replication workload into data collection intervals is related, at least in part, to the recovery point objective for the given replication workload. The recovery point objective is user-defined according to, e.g., service level agreements. The data collection interval is determined based at least in part on the recovery point objective and internal system conditions in a manner which enables compliance with the recovery point objective.

In some embodiments, the data replication management module 117 is configured to implement and manage data replication policies that describe different types of recovery, such as disaster recovery, operational recovery, logical corruption recovery, etc. Objectives of disaster recovery plans are formulated in terms of many attributes including, but not limited to, recovery point objective (RPO) and recovery time objective (RTO). In general, RPO refers to an acceptable amount of data loss measured in time relative to when failure event or disaster occurs at the primary (source) site. More particularly, RPO denotes a maximum acceptable delay time between the time when data is committed at the primary site and the time when the data is committed to the replica (target) site. The term RTO denotes the time to recover from a failure event or disaster.

Figure 2:
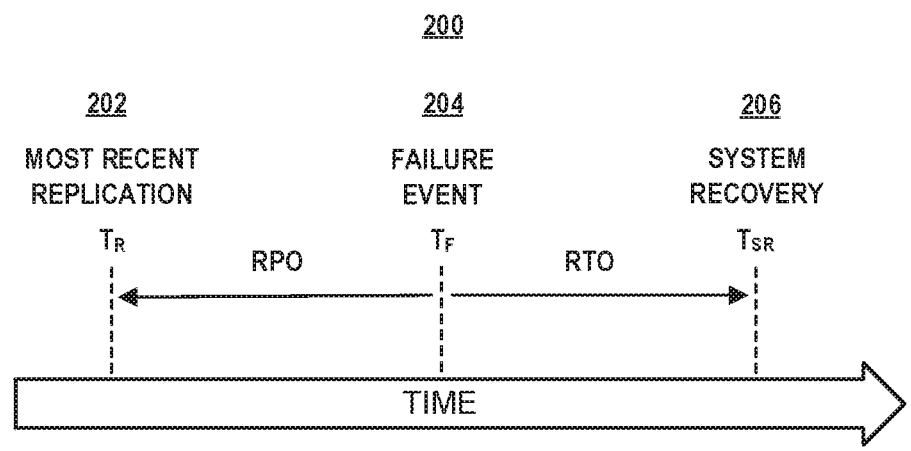
FIG. 2 illustrates timing between a failure event and recovery time and recovery point objectives in a data storage system that implements asynchronous data replication.

FIG. 2 illustrates timing between a failure event and recovery time and recovery point objectives in a data storage system that implements asynchronous data replication. In particular, FIG. 2 depicts a timing diagram 200 which shows a most recent replication event 202 occurring at time $T_R$, a failure event 204 occurring at time $T_F$, and completion of system recovery 206 occurring at time $T_{SR}$. In this example, it is assumed that the most recent replication event 202 has been performed by a replica site, and that the failure event 202 has occurred at a primary site of a data storage system requiring the initiation of a system recovery process to recover from such failure event.

In the context of FIG. 2, the time difference (e.g., $T_F-T_R$) between the failure event 204 at the primary site and the preceding replication event 202 should not exceed the specified RPO for the replication system, otherwise the failure event 204 would result in more data loss than what is acceptable under the specified RPO. The RPO value is specified when configuring the replication system, and is utilized to manage replication scheduling. An RPO can be specified in hours, minutes, or seconds, etc., depending on the given criticality of the application data, customer needs, etc. Furthermore, in the context of FIG. 2, the time difference (e.g., $T_{SR}-T_F$) between the system recovery 206 and the failure event 204 should not exceed the specified RTO for recovery of the data storage system. Depending on the given system, an RTO can be specified in days, hours, minutes, or seconds, depending on, e.g., the application priority, business requirements, etc. For high priority applications, failover services can be implemented to enable RTO in seconds.

The journal manager module 174 is configured to support asynchronous replication by applying journal barriers to divide the replication journal data into collection intervals for transmission to replica sites. In particular, the replication journal for a given workload is divided into data collection intervals, wherein a given data collection interval is transmitted to a replica site before transmission of a next data collection interval according to a replication schedule. The process of dividing the replication journal into barrier intervals for sequential transmission to a replica site allows the replica site to generate and maintain a consistent replica of the primary data by updating the data in the replica volume 182-D using the replication journal.

Figure 3:
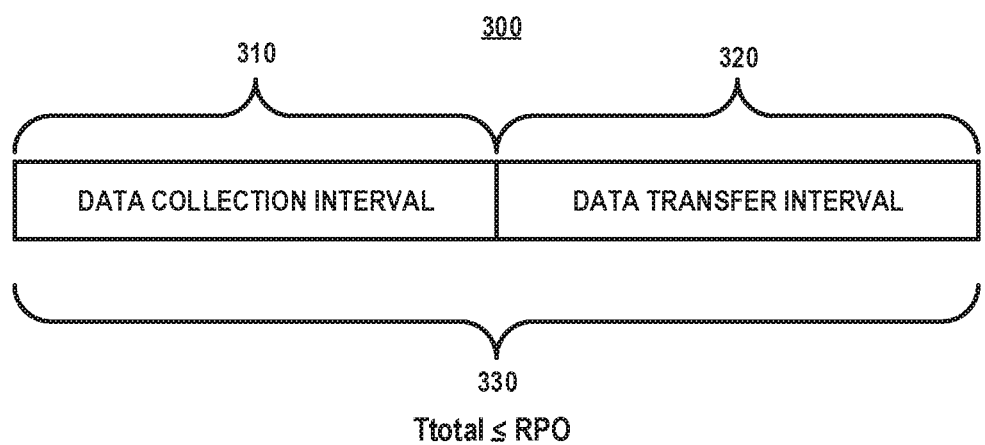
FIG. 3 schematically illustrates an asynchronous data replication scheduling process for transmitting data collection intervals of a replication journal in compliance with a recovery point objective for a given replication workload.

FIG. 3 schematically illustrates an asynchronous data replication scheduling process 300 for transmitting data collection intervals of a replication journal in compliance with an RPO for a given replication workload. As shown in FIG. 3, the scheduling process 300 comprises a data collection interval 310 and a data transfer interval 320. The data collection interval 310 represents a time interval for collecting data that is associated with a plurality of I/O write operations performed for a given replication workload by the primary site within a predefined barrier interval (it is to be noted that the terms "data collection interval" and "journal barrier interval" and "barrier interval" are synonymous terms and may be used interchangeably herein).

The data transfer interval 320 represents a time interval for transmitting the section of journal data to a replica site and committing the section of journal data to a replica journal. As further shown in FIG. 3, to comply with the specified RPO, a sum total time ($T_{total}$) of the data collection interval 310 in which the data is collected and the data transfer interval 320 should be less or equal to the RPO for the given replication workload so as to comply with the RPO. In some embodiments, the time value of the data collection interval 310 is set to be no longer than one-half RPO (i.e., RPO/2). This is based on an assumption that the time required to synchronize a barrier-journal (transmit and commit) is less than or equal to the time needed to write the same data at the primary site. An implementation selects the interval length of the data collection interval 310 according to the developer's considerations, wherein the interval is determined according to a function, $f_{Interval}(RPO)$, which calculates the interval based on the RPO. Assume that the RPO is set to 5 minutes. In this example, an RPO of 5 minutes means latest available replica data volume should not reflect a state that is older than 5 minutes.

Typically, in a data storage environment, there are multiple storage objects that are being replicated using asynchronous replication, and the replication workloads associated with the different storage objects vary greatly. For example, one storage object may experience a heavy I/O load and have a relatively long RPO, and therefore collects a very large amount of data that needs to be copied to the remote system in its interval-section. Another storage object may experience a light I/O load and short RPO and therefore collect a small amount of data to copy in its interval-section. An important observation is that workload with short RPO typically collects a small amount of changes in their short interval and therefore are typically characterized as small workloads.

The processing and transferring of a replication workload requires system resources, including memory. In some implementations, the memory is utilized for the data to be transferred and its metadata, and in other implementations the memory is used mainly for metadata. If the memory is not available when the replication workload data transfer interval begins, the data transfer interval may be delayed and cause the workload to miss its RPO target. A large replication workload may consume a large amount of resources and leave little free resources for a smaller replication workload. As a result, the smaller replication workload is throttled and perhaps even stalled by waiting for the larger replication workload to complete. In some cases, the smaller workloads have a short RPO and the delay in their processing can lead to failure to complete the data transfer in the RPO time limit.

When a barrier is closed, the barrier journal is consolidated (e.g., write folded, DPR (dynamic partial replication)) and the I/O write data synchronized to the replica site(s). The journal metadata is stored in the system memory 190 before being transmitted to the replica site(s). In this regard, the shared use of the allocated system memory 190 in a heterogenous configuration comprising multiple remote protection domains and multiple replication consistency groups with wide ranging RPOs can be problematic with regard to complying with the RPOs since the shared system memory can present a bottleneck in the synchronizing of the I/O write data to the replica site(s).

Indeed, the shared use of the memory for the DPR and synchronization process can create issues that may lead to a violation of the RPO for one or more replication workloads that are being concurrently handled by the storage data replication system 170. For example, assume a given replication consistency group may be unable to synchronize its replication journal to the remote protection domain due to a given failure, and does not release its memory. In such instances, other replication consistency groups may have to wait for access to the shared memory indefinitely. As a further example, a replication consistency group may have a relatively long RPO which takes a long time to complete the synchronization of its replication journal and, thus, holds a portion of the shared system memory 190 for the entire synchronization interval. This can cause starvation of the shared memory resource to another replication consistency group with a shorter RPO, which may have to wait for access to the shared memory, and possibly missing its RPO goal.

To ensure compliance with the RPOs of all replication workloads that share the limited system memory resources, the storage data replication system 170 takes into consideration a total number of I/O replication writes associated with the active replication workloads of replication consistency groups to ensure that an amount of data (e.g., I/O write metadata) associated with the total number of I/O replication writes at a given time will be able to fit within the portion of system memory. When the data (e.g., I/O write metadata) associated with the total number of I/O replication writes at a given time is determined to be approaching the maximum amount of data that can be stored in the allocated system memory, the storage data replication system 170 can create a common barrier interval for the journal data of all replication consistency groups, even if the barrier interval for the current data collection interval associated with a given replication consistency group (which is determined based, at least in part, on its RPO) has not yet been reached.

In other words, when a common barrier is generated, the common barrier represents a stop point for the current data collection intervals of all replication workloads, and new data collection intervals begin for all the replication workloads. In this regard, in response to a common barrier being generated, a new barrier-interval would begin for each replication journal of each replication workload. The common barrier can be created at a point in time that is possibly earlier than the scheduled time at which a barrier would be generated for a replication journal of a given replication workload based on the RPO associated with the given replication workload.

The common barrier ensures that the data associated with all I/O writes of all active replication workloads can be stored in the portion of the system memory that is allocated to store the data associated I/O writes for replication workloads. This prevents starvation of replication consistency groups that cannot obtain access to the system memory which is needed to synchronize their journals to replica sites in sufficient time to comply with associated RPOs.

In this regard, the storage data replication system 170 implements a process that guarantees all replication workloads can be processed and copied in parallel without throttling the write I/Os associated with any workload. In general, this process includes generating a data collection interval that is common to all concurrently executing replication workloads such that a sum total number of write I/Os in the interval-sections of all replication workloads can be stored in the available memory. This process is based on various considerations. For example, the memory consumed by a given replication workload is proportional to the number of I/O write operations that must be processed for the given replication workload. In addition, a maximum number of I/O write operations that are collected by all replication workloads during a given interval is bounded by the system IOPS (Input/Output Operations Per Second)

performance, and a length of the common data collection interval. A common interval is calculated such that the metadata associated with the maximum number I/O write operations that can be collected, in all replication workloads, during the common interval will fit into the available memory. The respective data collection intervals are generated for all replication workloads at the determined time of the common interval.

There are various advantages associated with such approach. For example, this process ensures that replication workloads which have relatively short RPOs will have the memory that is needed to comply with their RPO independent of other replication workloads that exist in the system. In addition, all replication workloads will have sufficient memory and can be processed in parallel. The memory resources are guaranteed without throttling any workload and therefore without adversely affecting the performance.

As mentioned above, the sharing of memory resources by a plurality of replication workloads is implemented by determining a common data collection interval which ensures that, even if the system receives the maximal number of write I/Os for replication writes, the collected I/Os of all the workloads within the common data collection interval can be processed in parallel using the available memory. The maximum number of I/O requests can be expressed in, e.g., IOPS or "write throughput" depending on the limiting factor of the specific implementation. The term "IOPS" refers to the number of I/O requests that can be processed by the system in a unit time (e.g., per second). The term "write throughput" refers to an amount of data that can be written to storage on a server per unit time (e.g., write throughput (MB/s)=write IOPS*KB per IO/1024). While exemplary embodiments are discussed herein in the context determining a common data collection interval as a function of write IOPS, this should not be deemed to impart any limitation of the scope of the embodiments. In this regard, the common data collection interval can be determined as function of some metric of write performance of the system, wherein the write performance can be, e.g., write IOPS, or write throughput, etc.

For example, in some embodiments, the common data collection interval is determined as a function of parameters such as: (i) total memory, (ii) write I/O memory size, and (iii) a maximum IOPS. The "total memory" denotes the total amount of system memory that is allocated to process replication workloads. The "write I/O memory size" denotes the amount of memory that is needed to process a single write I/O. The "maximum IOPS" refers to the maximum IOPS in which I/O write requests are received by the system. In some embodiments, the implementation of a common data collection interval should meet certain criteria.

For example, in some embodiments, the length of the common data collection interval is determined to be sufficiently long as possible in order to obtain a benefit associated with consolidation of writes to hot spots (e.g., write-folding). Most workloads have hot spots and consolidating the writes to those hot spots reduces the amount of data that needs to be transferred between the replication sites and reduces the total replication load. Moreover, as another criterion, the data collection interval for a given replication workload should be able to begin and end independently from the data collection intervals of other replication workloads and from the common data collection interval. In addition, the processing and transfer of the write I/O data for the given replication workload can start independently as well.

In a system where a plurality of replication workloads operate in parallel, it is assumed that there is a replication workload which has the longest data collection interval among the plurality of replication workloads. In addition, there can be two or more replication workloads with data collection intervals of the same length, and there can be one replication workload which has the shortest data collection interval among the plurality of replication workloads. For example, FIG. 4A illustrates data collections intervals associated with a plurality of replication workloads 400 operating in parallel. In particular, FIG. 4 illustrates a first replication workload 410 comprising a plurality of data collection intervals 410-1 and 410-2 which are divided by first individual journal barriers B1, a second replication workload 420 comprising a plurality of data collection intervals 420-1 and 420-2 that are divided by second individual journal barriers B2, a third replication workload 430 comprising a plurality of data collection intervals 430-1 and 430-2 that are divided by third individual journal barriers B3, a fourth replication workload 440 comprising a plurality of data collection intervals 440-1 and 440-2 that are divided by fourth individual journal barriers B4, and a fifth replication workload 450 comprising a plurality of data collection intervals 450-1, 450-2, and 450-3 that are divided by fifth individual journal barriers B5. In this example, the individual journal barriers B1, B2, B3, B4, and B5 are generated based, at least in part, on the RPO associated with the respective replication workloads 410, 420, 430, 440, and 450.

FIG. 4A illustrates that the different replication workloads 410-450 have different lengths of data collection intervals, wherein the replication workloads 410-450 are arranged top down from the longest interval to the shortest interval. In this example of FIG. 4A, it is assumed that the replication workload 410 has the longest data collection intervals, the workloads 420, 430, and 440 have the same or similar length of data collection intervals, and the replication workload 450 has the shortest data collection interval. As further shown in FIG. 4A, each replication workload may start at a different time and continue for a different length of interval. FIG. 4A shows that all workload intervals that can be processed at a given time T (denoted by a dashed line) are sub-intervals of the longest data collection interval of the first replication workload 410, or at most overlap portions of two of the longest data collection intervals (e.g., data collection intervals 410-1 and 410-2). In this instance, the total time of two of the longest data collection intervals of the first replication workload is as long (or longer) than an interval in which all replication workloads (which are processed in parallel) collect their respective data.

In the exemplary embodiment of FIG. 4A, the first replication workload 410 has the "maximum barrier interval" among all the replication workloads 400. It is to be noted that a maximum number of replicated I/O write operations that can be served during the time span of 2X the "maximum barrier interval" is limited by the maximum number of I/O requests the storage data replication system 170 can receive during such time span. In particular, the maximum number of replication I/O write operations that can be serviced in such time span is expressed as: (2×"maximum barrier interval"×maximum IOPS). The total amount of allocated system memory ("Total Mem") that is needed to store information related to such maximum number replication I/O write operations for all concurrently executing replication workloads can be determined as follows:

Total Mem=2×"maximum barrier interval"×maximum IOPS×I/O memory size, wherein (1)

$$\text{maximum barrier interval} = \text{Total Mem}/(2 \times \text{maximum IOPS} \times \text{I/O memory size}). \quad (2)$$

In some embodiments, a "common barrier interval" (or alternatively, "common interval") is defined to be the "maximum barrier interval" as follows:

$$\text{common barrier interval} = \text{Total Mem}/(2 \times \text{maximum IOPS} \times \text{I/O memory size}), \quad (3)$$

assuming that there is a sufficient amount of system memory ("Total Mem") that can be allocated to store the information related to the maximum number of possible replication I/O write operations that can be serviced for all concurrently executing replication workloads. On the other hand, in some embodiments, if the "maximum barrier interval" for the replication workload with the greatest RPO is too long, the total amount of allocated system memory (Total Mem) may be prohibitively large. In such instance, instead of using the "maximum barrier interval" to determine Total Mem, the "common barrier interval" can be selected to be a value which is less than the "maximum barrier interval" (e.g., independent of the RPO of the replication workload with the largest data collection interval), to thereby limit the Total Mem to a reasonable value. It is to be noted that the term "maximum IOPS" as used in the above equations (1), (2) and (3) can be replaced with "maximum write throughput" or similar types of performance parameters.

For this implementation, the replication workload interval for a given replication workload is determined as the minimum between the "common barrier interval" and the barrier interval that is a function of the RPO for given replication workload. In other words, the workload interval for a given replication workload is determined by: Replication Workload Interval=Min($f_{Interval}$(RPO), common barrier interval)). In this regard, a journal barrier for a given replication workload will be applied at a point in time when either the time for applying an individual barrier interval arises or the time for applying a common barrier to all replication workloads arises, whichever occurs first. For each replication workload, when the associated journal has been closed by applying an individual journal barrier or a common barrier, a new interval-section for the journal of the replication workload will be started immediately following the closing of the interval-section of the journal. By utilizing this process for all concurrently executing replication workloads, the metadata and other data associated with the I/O write operations for all replication workloads can be guaranteed to fit into the allocated system memory and can be processed in parallel.

The solution described above establishes a common barrier interval (time period) which is based on a maximum IOPS (or alternatively write throughput). Typically, the actual I/O load is much lower than the maximum possible load. When a common barrier interval is generated based on the calculations described above, most of the time the number of replication writes collected during such common barrier interval will be much smaller than the total number of replication writes that can actually fit into the allocated system memory. If, for example, the received replication writes comprise 20% of the maximum IOPS, then the I/O write request collected in the determined common barrier interval will only utilize 20% of available memory. Clearly, in this example the common barrier interval can be extended and still fit the processing of all collected replication I/O write into the allocated system memory.

In view of the above, in other embodiments, the point in time for generating a common barrier for closing the journals of concurrently executing replication workloads can be determined based on a number of actual replication I/O writes that occur within a given common barrier interval. In this embodiment, a common barrier interval is determined using the above process, and the storage data replication system 170 proceeds to track a number of I/O write requests that have been processed by all replication workloads starting from the beginning of a new common barrier interval. In this embodiment, instead of generating a common barrier at the expiration of the common barrier interval, a common barrier can be generated when the count of the received replication I/O writes reaches a prespecified number of replication I/O writes in a current common barrier interval, before expiration of the current common barrier interval.

In particular, given the "common barrier interval" which is determined via equation (3) as described above, the I/O limit is determined as:

$$\text{I/O limit} = N \times \text{common barrier interval} \times \text{maximum IOPS}, \quad (4)$$

wherein N is a pre-specified ratio of 1 or less. With this process, the respective barrier intervals for the replication workloads are calculated as a function of the associated RPOs (i.e., $f_{Interval}$(RPO). In addition, a common barrier is applied to the close the journals of the replication workloads based on the determined I/O limit. With this process, a count of the received replication I/O writes maintained starting from a last calculated I/O limit break. When the replication I/O write count reaches the determined I/O limit (as specified by equation (4) above), a common barrier is initiated for all the replication workloads.

In most cases, the use of the modified process yields results similar to the time-based algorithm and allows all workloads to be processed in parallel. However, there are instances where the processing and transfer of some replication workflow interval-sections may occur in parallel with other interval-sections that were collected at a different time. For example, a given interval-section of a given replication workload can be processed and transferred out of sync, i.e., not in parallel with other interval-sections of other replication workloads collected at the same time, when there are delays in the processing and transfer. In this regard, the sum of the replication I/O writes collected in the interval-sections can exceed the determined I/O limit and therefore may not fit into the allocated system memory. These cases would not normally happen when there are no failures.

However, to ensure that the allocated system memory is not exhausted, or to otherwise prevent starvation of the memory resources, as a result of such failures causing or other reasons, the value of N can be set to some value that is less than 1 (i.e., N<1), which allows some flexibility in the scheduling without adverse impact to utilization of the shared system memory for the replication workloads. For example, in one exemplary embodiment, the value of N can be set to N=0.5, such that when the actual I/O count reaches 50% of the pre-specified I/O limit (equation (4)), the storage data replication system 170 can initiate the generation of a common barrier (e.g., the storage data replication system 170 requests the replication management module 117, FIG. 1A to trigger a common barrier). This allows for some delay period between the initiation of the common barrier and the actual application of the common barrier to close the journal instances of the replication workload, while being able to store additional replication I/O writes that may be received during the delay period. In addition, this can prevent or eliminate exhaustion of the allocated system memory in a current barrier interval in instances where there is a delay in the transferring of one or more current or previously generated barrier intervals for one or more replication workloads, which have not yet been released from the system memory.

Figure 5:
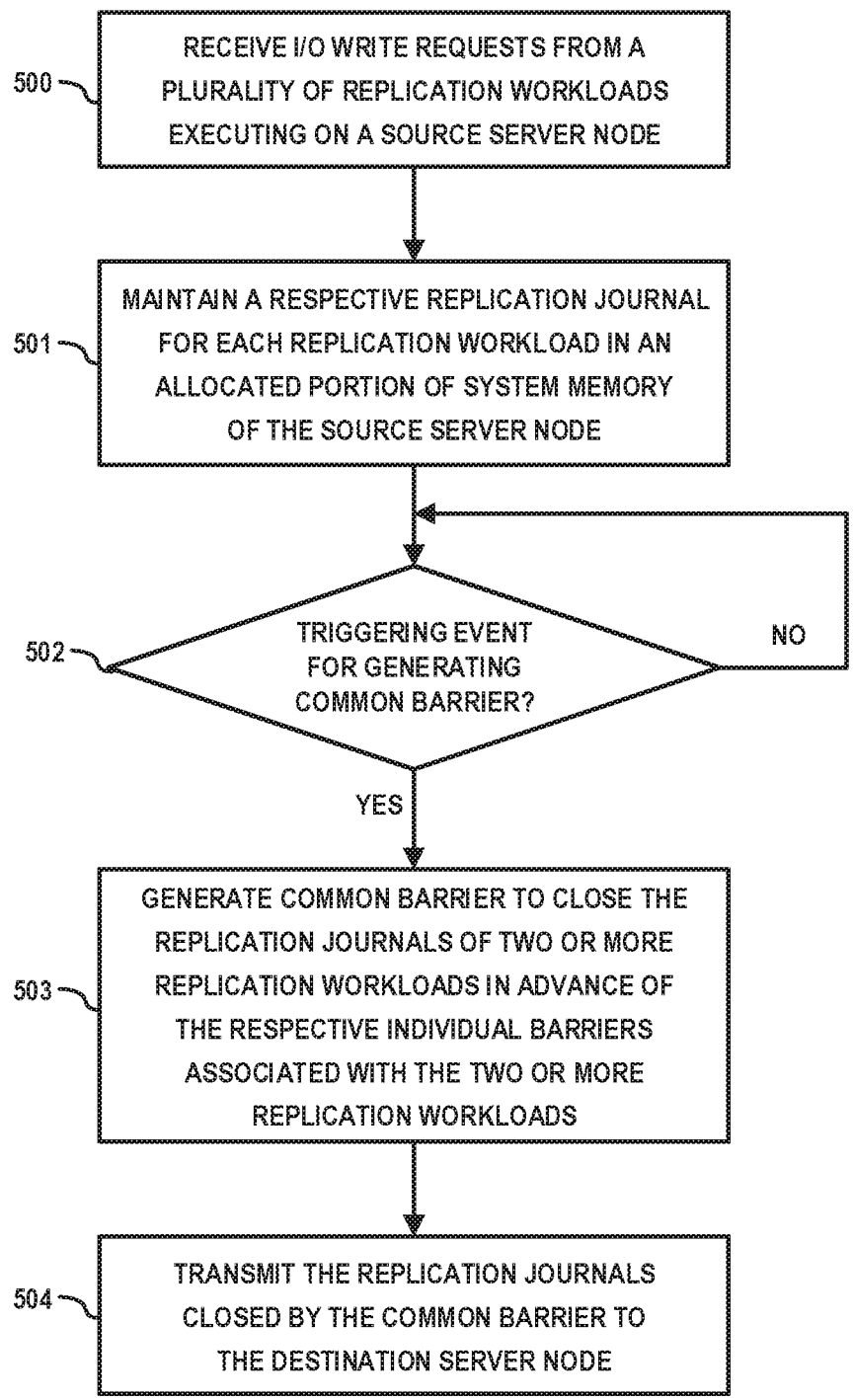
FIG. 5 is a flow diagram of a method for managing the utilization of shared memory resources among a plurality of asynchronous replication workloads, according to an exemplary embodiment of the disclosure.

Exemplary methods for managing the utilization of shared memory resources among a plurality of asynchronous replication workloads will now be described with reference to FIG. 4B and FIG. 5. FIG. 4B illustrates data collections intervals 400-1 that are generated for the plurality of parallel replication workloads of FIG. 4A when applying a common barrier to close replication journals associated with two more of the replication workloads, according to an exemplary embodiment of the disclosure. FIG. 5 is a flow diagram of a method for managing the utilization of shared memory resources among a plurality of asynchronous replication workloads, according to an exemplary embodiment of the disclosure. In particular, FIG. 5 illustrates exemplary modes of operation of the storage data replication system 170.

The data replication system receives I/O write requests associated with a plurality of replication workloads executing concurrently on a source server node which hosts the data replication system (block 502). The data replication system maintains a respective replication journal for each replication workload in an allocated portion of system memory of the source server node, wherein each replication journal is divided into journal barrier intervals by respective individual barriers for transmission to a destination server node based, at least in part, on respective recovery point objectives associated with the replication workloads (block 501).

While the data replication system receives the I/O write requests and updates the replication journals, the data replication system enters a wait state for the occurrence of a triggering event for generating a common barrier (block 502). The triggering event is configured to prevent exhaustion of the allocated portion of system memory for storing the replication journals of the plurality of replication workloads in the system memory of the source server node. In some embodiments, the triggering event comprises an expiration of a predefined common barrier interval. For example, in some embodiments, the predefined common barrier interval is determined as a function of (i) a total size of the system memory, (ii) a maximum write throughput of the data replication system, and (iii) a size of memory for processing a single I/O write request. In other embodiments, predefined common barrier interval is determined as a function of (i) a total size of the allocated portion of system memory, (ii) a maximum I/O operations per second of the data replication system, and (iii) a size of memory for processing a single I/O write request.

In some embodiments, the triggering event comprises a number of I/O write requests of the plurality of replication workload meeting a threshold number of I/O requests from a time of generation of a previous common barrier. Further, in some embodiments, the triggering event comprises a number of I/O write requests of the plurality of replication workload meeting a threshold number of I/O requests before expiration of a predefined common barrier interval.

When it is determined that a triggering event for generating a common barrier has occurred (affirmative determination in block 502), the data replication system will generate a common barrier to close the respective replication journals of at least two replication workloads in advance of the respective individual barriers associated with the at least two replication workloads (block 503), and then commence transmission of the replication journals, which were closed by the common barrier, to the destination server node (block 504). When transmission is complete and acknowledgment is received from the destination server node, the closed replication journals can be released from memory.

FIG. 4B illustrates a process of applying a common barrier to close the replication journals associated with two more of the replication workloads of FIG. 4A, according to an exemplary embodiment of the disclosure. In particular, FIG. 4B illustrates an exemplary embodiment in which a common barrier (denoted by line BC) is applied at the time T (shown in FIG. 4A) to close the data collection intervals 410-1, 420-1, 430-1, and 440-1 (i.e., close the active replication journal instances) of the respective replication workloads 410, 420, 430, and 440, in advance of the expiration of a predefined common barrier interval defined by the respective individual journal barriers B1, B2, B3, and B4, as shown in FIG. 4A. As further shown in FIG. 4B, once the data collection intervals are closed, the new data collection intervals 410-2, 420-2, 430-2, and 440-2 are started following the common barrier BC.

In some embodiments, as shown in FIG. 4B, certain replication journals of the executing replication workloads will be excluded from being closed by the common barrier. In particular, FIG. 4B illustrates an exemplary embodiment in which the data collection interval 450-2 of the replication workload 450 is not closed by the common barrier BC. Such exclusion occurs when, e.g., the barrier interval of the given replication journal is deemed to have been recently started by a predetermined amount of time prior to a time of the common barrier BC, or when the current barrier interval of the given replication journal is deemed to have utilized an amount of system memory which is below a target threshold memory usage at a time of the common barrier. As shown in FIG. 4B, the common barrier BC is generated at a short time following the individual journal barrier B5 that initiated the data collection interval 450-2. In this instance, given the data collection interval 450-2 is new and may have a minimal amount of replication journal data in system memory, the data collection interval 450-2 can remain open, as it could be considered a waste of resources to transmit such a small amount of data associated with the data collection interval 450-2 if it were prematurely closed by the common barrier BC.

Figure 6:
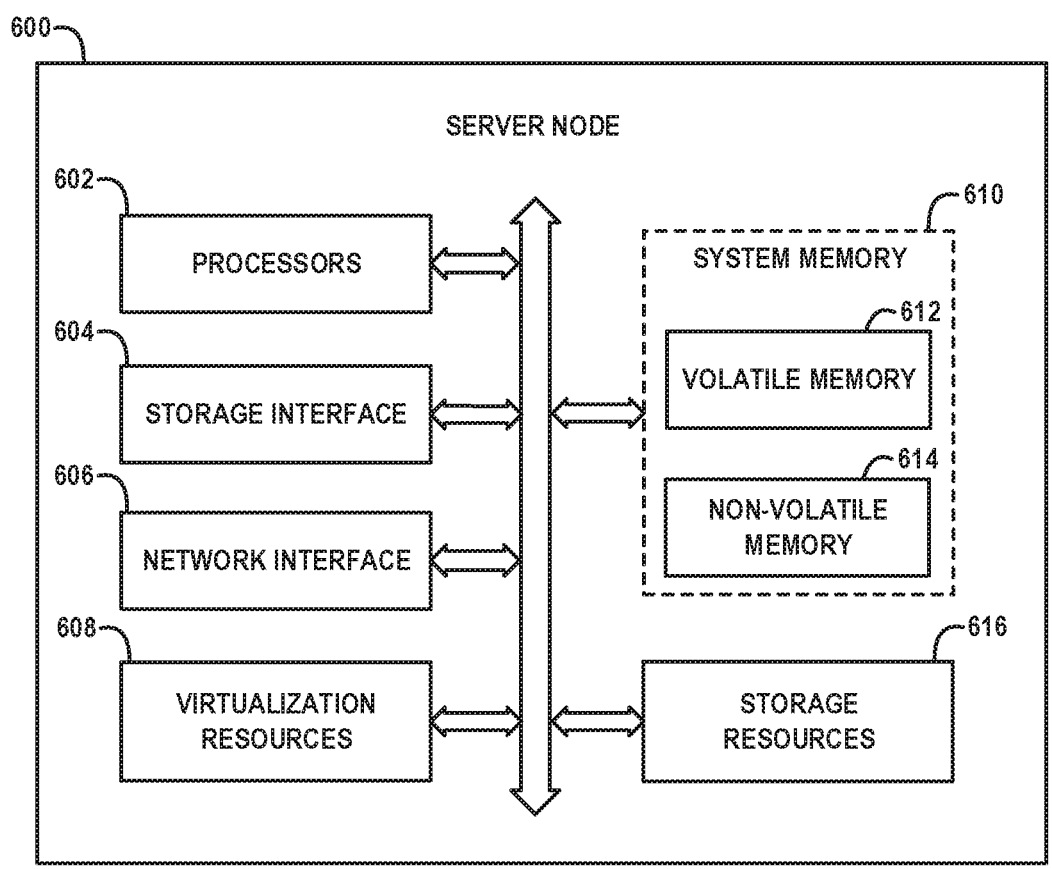
FIG. 6 schematically illustrates a framework of a server node for implementing a storage node which hosts a data replication system according to an exemplary embodiment of the disclosure.

FIG. 6 schematically illustrates a framework of a server node 600 for implementing a storage node (e.g., storage node 140, FIGS. 1A and 1B) according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more service or functions which are hosted by the server node 600. For example, the virtualization resources 608 can be configured to implement the various modules and functionalities of the storage control system 150 (FIG. 1B) as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities of the storage control system 150 as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of the storage control systems, snapshot management systems, and data backup management systems comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile system memory 612 is configured as the highest-level memory tier, and the non-volatile system memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
  receiving, by a data replication system, input/output (I/O) write requests associated with each of a plurality of replication workloads executing concurrently on a source server node which hosts the data replication system;
  maintaining, by the data replication system, a respective replication journal for each replication workload in an allocated portion of system memory of the source server node, wherein each replication journal is divided into journal barrier intervals by respective individual barriers for transmission to a destination server node, wherein the journal barrier intervals of the respective replication journals comprise journal data collection intervals for the respective replication workloads, and wherein the journal data collection intervals are based, at least in part, on respective recovery point objectives associated with the replication workloads;
  determining, by the data replication system, an occurrence of a triggering event for generating a common barrier, wherein the triggering event is configured to prevent exhaustion of the allocated portion of system memory for storing the replication journals of the plurality of replication workloads in the allocated portion of system memory of the source server node;
  generating, by the data replication system, the common barrier to prematurely close the journal data collection intervals of the respective replication journals of at least two replication workloads in response to the occurrence of the triggering event; and
  transmitting, by the data replication system, the replication journals closed by the common barrier, to the destination server node.

2. The method of claim 1, wherein the triggering event comprises an expiration of a specified common barrier interval.

3. The method of claim 2, wherein the specified common barrier interval is determined as a function of (i) a total size of the system memory, (ii) a maximum write throughput of the data replication system, and (iii) a size of memory for processing a single I/O write request.

4. The method of claim 2, wherein the specified common barrier interval is determined as a function of (i) a total size of the allocated portion of system memory, (ii) a maximum I/O operations per second of the data replication system, and (iii) a size of memory for processing a single I/O write request.

5. The method of claim 1, wherein the triggering event comprises a number of I/O write requests of the plurality of replication workloads meeting a threshold number of I/O requests from a time of generation of a previous common barrier.

6. The method of claim 1, wherein the triggering event comprises a number of I/O write requests of the plurality of replication workloads meeting a threshold number of I/O requests before expiration of a specified common barrier interval.

7. The method of claim 1, further comprising excluding a given replication journal for a given one of the replication workloads from being closed by the common barrier, when the journal barrier interval of the given replication journal is deemed to have been recently started by a predetermined amount of time prior to a time of the common barrier.

8. The method of claim 1, further comprising excluding a given replication journal for a given replication workload from being closed by the common barrier, when the journal barrier interval of the given replication journal is deemed to have utilized an amount of system memory which is below a target threshold memory usage at a time of the common barrier.

9. An article of manufacture comprising a non-transitory processor-readable storage medium having stored therein program code of one or more software programs, wherein the program code is executable by one or more processors to implement a method which comprises:
  receiving, by a data replication system, input/output (I/O) write requests associated with each of a plurality of replication workloads executing concurrently on a source server node which hosts the data replication system;
  maintaining, by the data replication system, a respective replication journal for each replication workload in an allocated portion of system memory of the source server node, wherein each replication journal is divided into journal barrier intervals by respective individual barriers for transmission to a destination server node, wherein the journal barrier intervals of the respective replication journals comprise journal data collection intervals for the respective replication workloads, and wherein the journal data collection intervals are based, at least in part, on respective recovery point objectives associated with the replication workloads;
  determining, by the data replication system, an occurrence of a triggering event for generating a common barrier, wherein the triggering event is configured to prevent exhaustion of the allocated portion of system memory for storing the replication journals of the plurality of replication workloads in the allocated portion of system memory of the source server node;
  generating, by the data replication system, the common barrier to prematurely close the journal data collection intervals of the respective replication journals of at least two replication workloads in response to the occurrence of the triggering event; and
  transmitting, by the data replication system, the replication journals closed by the common barrier, to the destination server node.

10. The article of manufacture of claim 9, wherein the triggering event comprises an expiration of a specified common barrier interval.

11. The article of manufacture of claim 10, wherein the specified common barrier interval is determined as a function of (i) a total size of the system memory, (ii) a maximum write throughput of the data replication system, and (iii) a size of memory for processing a single I/O write request.

12. The article of manufacture of claim 10, wherein the specified common barrier interval is determined as a function of (i) a total size of the system memory, (ii) a maximum I/O operations per second of the data replication system, and (iii) a size of memory for processing a single I/O write request.

13. The article of manufacture of claim 9, wherein the triggering event comprises a number of I/O write requests of the plurality of replication workloads meeting a threshold number of I/O requests from a time of generation of a previous common barrier.

14. The article of manufacture of claim 9, wherein the triggering event comprises a number of I/O write requests of the plurality of replication workloads meeting a threshold number of I/O requests before expiration of a specified common barrier interval.

15. The article of manufacture of claim 9, further comprising program code for excluding a given replication journal for a given one of the replication workloads from being closed by the common barrier, when the journal barrier interval of the given replication journal is deemed to have been recently started by a predetermined amount of time prior to a time of the common barrier.

16. The article of manufacture of claim 9, further comprising program code for excluding a given replication journal for a given replication workload from being closed by the common barrier, when the journal barrier interval of the given replication journal is deemed to have utilized an amount of system memory which is below a target threshold memory usage at a time of the common barrier.

17. A server node, comprising:
at least one processor; and
a system memory configured to store program code, wherein the program code is executable by the at least one processor to implement a data replication system which is configured to:
receive input/output (I/O) write requests associated with each of a plurality of replication workloads executing concurrently on the server node;
maintain a respective replication journal for each replication workload in an allocated portion of the system memory of the server node, wherein each replication journal is divided into journal barrier intervals by respective individual barriers for transmission to a destination server node, wherein the journal barrier intervals of the respective replication journals comprise journal data collection intervals for the respective replication workloads, and wherein the journal data collection intervals are based, at least in part, on respective recovery point objectives associated with the replication workloads;
determine an occurrence of a triggering event for generating a common barrier, wherein the triggering event is configured to prevent exhaustion of the allocated portion of system memory for storing the replication journals of the plurality of replication workloads in the allocated portion of system memory of the source server node;
generate the common barrier to prematurely close the journal data collection intervals of the respective replication journals of at least two replication workloads in response to the occurrence of the triggering event; and
transmit the replication journals closed by the common barrier, to the destination server node.

18. The server node of claim 17, wherein the triggering event comprises an expiration of a specified common barrier interval, and wherein the specified common barrier interval is determined as a function of (i) a total size of the system memory, (ii) a size of memory for processing a single I/O write request, and (iii) one of a maximum write throughput of the data replication system, and a maximum I/O operations per second of the data replication system.

19. The server node of claim 17, wherein the triggering event comprises one of (i) a number of I/O write requests of the plurality of replication workload meeting a threshold number of I/O requests from a time of generation of a previous common barrier and (ii) a number of I/O write requests of the plurality of replication workload meeting a threshold number of I/O requests before expiration of a specified common barrier interval.

20. The server node of claim 17, wherein the data replication system is further configured to at least one of (i) exclude a given replication journal for a given one of the replication workloads from being closed by the common barrier, when the journal barrier interval of the given replication journal is deemed to have been recently started by a predetermined amount of time prior to a time of the common barrier, and (ii) exclude a given replication journal for a given replication workload from being closed by the common barrier, when the journal barrier interval of the given replication journal is deemed to have utilized an amount of system memory which is below a target threshold memory usage at a time of the common barrier.

* * * * *